United States Patent
Bonot et al.

(10) Patent No.: US 10,538,443 B2
(45) Date of Patent: Jan. 21, 2020

(54) METHOD OF DEGRADATION AND INACTIVATION OF ANTIBIOTICS IN WATER BY IMMOBILIZED ENZYMES ONTO FUNCTIONALIZED SUPPORTS

(71) Applicant: Luxembourg Institute of Science and Technology (LIST), Esch/Alzette (LU)

(72) Inventors: Sebastien Bonot, Nancy (FR); Henry-Michel Cauchie, Strassen (LU)

(73) Assignee: LUXEMBOURG INSTITUTE OF SCIENCE AND TECHNOLOGY (LIST), Esch/Alzette (LU)

( * ) Notice: Subject to any disclaimer, the term of this patent is extended or adjusted under 35 U.S.C. 154(b) by 220 days.

(21) Appl. No.: 15/535,825

(22) PCT Filed: Dec. 14, 2015

(86) PCT No.: PCT/EP2015/079606
§ 371 (c)(1),
(2) Date: Jun. 14, 2017

(87) PCT Pub. No.: WO2016/096736
PCT Pub. Date: Jun. 23, 2016

(65) Prior Publication Data
US 2017/0341964 A1  Nov. 30, 2017

(30) Foreign Application Priority Data
Dec. 16, 2014  (EP) .................. 14198340

(51) Int. Cl.
*C02F 3/34* (2006.01)
*C02F 3/08* (2006.01)
(Continued)

(52) U.S. Cl.
CPC ............. *C02F 3/342* (2013.01); *C02F 3/085* (2013.01); *C02F 3/108* (2013.01);
(Continued)

(58) Field of Classification Search
CPC ...... B09B 3/00; B09B 5/00; C02F 3/00; C02F 3/085; C02F 3/108; C02F 3/34;
(Continued)

(56) References Cited

U.S. PATENT DOCUMENTS

2013/0236944 A1* 9/2013 Bensoussan ............. C02F 3/10
435/174

FOREIGN PATENT DOCUMENTS

WO    WO2013149662 A1 * 4/2012 ............. C02F 3/34
WO       2013149662 A1   10/2013

OTHER PUBLICATIONS

Poncin-Epaillard, et al., "Surface Treatment of Polymeric Materials Controlling the Adhesion of Biomolecules," Journal of Functional Biomaterials, 3:528-543. (Year: 2012).*
(Continued)

*Primary Examiner* — Patrick Orme
(74) *Attorney, Agent, or Firm* — Sandberg Phoenix & von Gontard PC (57) ABSTRACT

The present invention relates to a method for degrading and inactivating at least one xenobiotic, the at least one xenobiotic being present in an aqueous medium. The method comprises the steps of (a) grafting at least one enzyme onto a solid support, (b) incubating the solid support with the at least one enzyme into the aqueous medium and (c) measuring the evolution of the concentration of the at least one xenobiotic. The method is remarkable in that the at least one enzyme is New-Dehli metallo-β-lactamase 1, a laccase extracted from *Pleurotus ostreatus* and/or a β-lactamase extracted from *Pseudomonas aeruginosa* and in that the solid support is a moving bed carrier.

14 Claims, 2 Drawing Sheets a b (51) Int. Cl.
    *C02F 3/10*         (2006.01)
    *C02F 101/30*     (2006.01)
    *C02F 103/34*     (2006.01)

(52) U.S. Cl.
    CPC .... *C02F 2101/30* (2013.01); *C02F 2103/343* (2013.01); *C02F 2209/00* (2013.01)

(58) Field of Classification Search
    CPC .................. C02F 3/342; C02F 2101/30; C02F 2103/343; C02F 2209/00; Y02W 10/15; C12N 9/0061; C12N 9/86
    See application file for complete search history.

(56) References Cited

OTHER PUBLICATIONS

International Search Report from corresponding International Application No. PCT/EP2015/079606, dated Feb. 29, 2016.
Kumarasamy K K et al: "Emergence of a new antibiotic resistance mechanism in India, Pakistan, and the UK: a molecular, biological, and epidemiological study", Lancet Infectious Diseases, Elsevier Ltd., US, vol. 10, No. 9, Sep. 1, 2010, pp. 597-602.

\* cited by examiner

METHOD OF DEGRADATION AND INACTIVATION OF ANTIBIOTICS IN WATER BY IMMOBILIZED ENZYMES ONTO FUNCTIONALIZED SUPPORTS

CROSS-REFERENCE TO RELATED APPLICATIONS

The present invention is the US national stage under 35 U.S.C. § 371 of International Application No. PCT/EP2015/079606, which was filed on Dec. 14, 2015, and which claims the priority of application EP 14198340.3 filed on Dec. 16, 2014, the content of which (text, drawings and claims) are incorporated here by reference in its entirety.

FIELD

The invention is directed to a method of degradation and inactivation of xenobiotics, e.g., antibiotics, which are present in an aqueous medium. More particularly, the invention is directed to enzymes immobilized on solid support to degrade and inactive antibiotics present in water.

The invention is also directed to the solid supports, on which the enzymes able to degrade and inactivate antibiotics present in an aqueous medium are immobilized.

BACKGROUND

US patent application published US 2013/0236944 A1 relates to methods for inactivating antibiotics in the environment by means of using enzyme, such as laccase, lipase, cellulase, ketoreductase, β-lactamase and/or erythromycin-esterase. The compositions disclosed have as purpose to decontaminate the polluted environments and to prevent the environment pollution by antibiotics from waste and wastewater effluents before they reach the environment. The laccase of the disclosure is from *Trametes versicolor* (or *Coriolus versicolor*). The lipase of the disclosure is from *Achromobacter* spp. The cellulose of the disclosure is from *Trichodrema reesei*. The antibiotics targeted by the laccase of the disclosure are selected from the cyclines family (tetracycline, oxytetracycline (OTC) and chlortetracycline) or the β-lactams family, whose penicillin (amoxicillin), cephalosporin (cefdinir) and/or carbapenem (imipenem). The antibiotics targeted by the lipase of the disclosure are selected from the macrolide family (erythromycin) or the β-lactam family (amoxicillin). The antibiotics targeted by the ketoreductase of the disclosure are selected from the β-lactam family (amoxicillin or imipenem). The antibiotics targeted by the β-lactamase are selected from the β-lactam family (penicillins, cephalosporins, cephamycins or carbapenems). The antibiotics targeted by the erythromycin-esterase of the disclosure are selected from the macrolides family (erythromycin or clarithromycin). The disclosure further provides a solid support comprising at least one antibiotic-inactivating enzyme immobilized thereon. The solid supports can include adsorbent materials. The solid supports can be a membrane to which the enzymes are immobilized by covalent linkage. The enzymes can also be immobilized by gel entrapment. The solid support can be packed in a column or used in packed-bed reactors with environmental or waste waters to be treated flowing through the reactor and being in contact with immobilized enzymes. The solid support can also be coupled to other solid supports to enhance the inactivation process.

The advantages of using solid supports are well known. The contact area between the antibiotics to be treated and the enzyme is increased, favoring therefore the rate and the yield of the enzymatic reaction. Furthermore, solid supports are known to be relatively resistant to high pressure and to high temperature.

However, the setting of the above disclosure, namely the packing in a column or the use in the packed-bed reactors would cause difficulties such as back mixing with "plugs" of fluid passing through the reactors, leading to various issues, such as difficulties to get even distribution of the load (i.e. the water to be treated) on the whole carrier surface.

SUMMARY

The invention has for technical problem to degrade and inactivate antibiotics, such as β-lactam antibiotics and/or sulfonamide antibiotics present in an aqueous medium, with enzymes immobilized on a solid support. The solution of this technical problem hunts for a process that facilitates the known processes and/or that prevents some inherent problems caused notably by the solid support.

The present invention relates in a main aspect to a method for degrading and inactivating at least one xenobiotic, the at least one xenobiotic being present in an aqueous medium. The method comprises the following steps:
 a. grafting at least one enzyme onto a solid support,
 b. incubating the solid support with the at least one enzyme into the aqueous medium and,
 c. measuring the evolution of the concentration of the at least one xenobiotic.

The method is remarkable in that the at least one enzyme is New-Dehli metallo-β-lactamase 1, a laccase extracted from *Pleurotus ostreatus* and/or a β-lactamase extracted from *Pseudomonas aeruginosa* and in that the solid support is a moving bed carrier.

In various embodiments, the moving bed carrier is in high-density polyethylene.

In various embodiments, the moving bed carrier is a Kaldnes biochip.

In various embodiments, the moving bed carrier is activated with at least one precursor prior the grafting of at least one enzyme.

In various embodiments, the moving bed carrier is functionalized with the deposition of a layer containing reactive groups, such as epoxy or quinone groups, prior the grafting of at least one enzyme.

In various embodiments, the functionalization step is performed by surface treatment, with the at least one precursor, of the moving bed carrier by cold plasma deposition at atmospheric pressure or by coating, the coating being in various instances an auto-polymerization process.

In various embodiments, the at least one precursor is polyglycidyl methacrylate, dopamine, maleic anhydride/vinyltrimethoxysilane, or dopamine acrylamide/vinyltrimethoxysilane, in various instances polyglycidyl methacrylate or dopamine.

In various embodiments, the method further comprises the step of saturation of the solid support by a microorganisms anti-adhesion layer after the grafting of the at least one enzyme onto the solid support.

In various embodiments, the microorganisms anti-adhesion layer comprises Tween 20.

In various embodiments, the at least one enzyme is chosen in a purified form.

In various embodiments, the incubating step is performed at room temperature and under agitation, in various instances at 30, 50, 100, 200 and 300 rpm, for example at 100 rpm.

In various embodiments, the step of measuring the evolution of the concentration of the at least one xenobiotic is performed by UV absorbance measurements or by liquid chromatography/tandem mass spectrometry.

In various embodiments, the at least one xenobiotic is at least one antibiotic.

In various embodiments, the at least one antibiotic is an antibiotic chosen from the class of β-lactam antibiotics or from the class of sulfonamide antibiotics.

In various embodiments, the antibiotic is amoxicillin or sulfamethoxazole.

The present invention also relates, in various embodiments, to a solid support comprising at least one enzyme adapted for degrading and inactivating at least one xenobiotic, the at least one xenobiotic being present in an aqueous medium. The solid support is remarkable in that the at least one enzyme is New-Dehli metallo-β-lactamase 1, a laccase extracted from *Pleurotus ostreatus* and/or a β-lactamase extracted from *Pseudomonas aeruginosa*, and in that the solid support is a moving bed carrier.

In various embodiments, the present invention further relates in an auxiliary aspect to a method for degrading and inactivating at least one xenobiotic, the at least one xenobiotic being present in an aqueous medium. The method comprises the following steps:
a. incubating a laccase extracted from *Pleurotus ostreatus* into the aqueous medium and,
b. measuring the evolution of the concentration of the at least one xenobiotic.

The method is remarkable in that the laccase extracted from *Pleurotus ostreatus* is used in its pure form.

In various embodiments, the incubation step is performed at room temperature and under agitation, in various instances at 30, 50, 100, 200 and 300 rpm, for example at 100 rpm.

In various embodiments, the step of measuring the evolution of the concentration of the at least one xenobiotic is performed by UV absorbance measurements or by liquid chromatography/tandem mass spectrometry.

In various embodiments, the at least one xenobiotic is at least one antibiotic.

In various embodiments, the at least one antibiotic is an antibiotic chosen from the class of sulfonamide antibiotics.

In various embodiments, the antibiotic is sulfamethoxazole.

In various embodiments, the laccase extracted from *Pleurotus ostreatus* is immobilized on a solid support, in various instances a moving bed carrier.

In various embodiments, the moving bed carrier is in high-density polyethylene.

In various embodiments, the moving bed carrier is a Kaldnes biochip.

In various embodiments, the moving bed carrier is functionalized with the deposition of a layer containing reactive groups, such as epoxy or quinone groups, prior the grafting of the laccase extracted from *Pleurotus ostreatus*.

In various embodiments, the functionalization step is performed by surface treatment, with the at least one precursor, of the moving bed carrier by cold plasma deposition at atmospheric pressure or by coating, the coating being in various instances an auto-polymerization process.

In various embodiments, the at least one precursor is polyglycidyl methacrylate, dopamine, maleic anhydride/vinyltrimethoxysilane, or dopamine acrylamide/vinyltrimethoxysilane, in various instances polyglycidyl methacrylate or dopamine.

In various embodiments, the immobilization of the laccase extracted from *Pleurotus ostreatus* further comprises the step of saturation of the solid support by a microorganisms anti-adhesion layer after the immobilization of the laccase extracted from *Pleurotus ostreatus* onto the solid support.

In various embodiments, the microorganisms anti-adhesion layer comprises Tween 20.

In various embodiments, the present invention further relates in an auxiliary aspect to a method for degrading and inactivating at least one antibiotic, the at least one antibiotics being present in an aqueous medium. The method comprises the following steps:
a. incubating New-Dehli metallo-β-lactamase 1 into the aqueous medium and,
b. measuring the evolution of the concentration of the at least one antibiotic.

The method is remarkable in that the at least one antibiotic is one antibiotic chosen among the class of β-lactams, polypeptides, lincosanides, tetracyclines, sulfonamides and/or macrolides.

In various embodiments, the New-Dehli metallo-β-lactamase 1 is produced from a bacterium *Escherichia coli* of the type BL21 2D3.

In various embodiments, the bacterium *Escherichia coli* of the type BL21 2D3 has been transformed with a plasmid, in various instances a pOPINF plasmid.

In various embodiments, the pOPINF plasmid comprises the gene encoding *Klebsiella pneumonia* New-Dehli metallo-β-lactamase 1.

In various embodiments, the antibiotic chosen among the class of β-lactams is chosen among penicillin and carbapanem, in various instances amoxicillin and/or imipenem.

In various embodiments, the antibiotic chosen among the class of polypeptides is bacitracin.

In various embodiments, the antibiotic chosen among the class of linconsanides is lincomycin.

In various embodiments, the antibiotic chosen among the class of tetracyclines is oxytetracycline.

In various embodiments, the antibiotic chosen among the class of sulfonamide is sulfamethoxazole and/or trimethoprime.

In various embodiments, the antibiotic chosen among the class of macrolide is tylosine and/or erythromycin.

In various embodiments, the concentration of the at least one antibiotics is of 100 $\mu g \cdot ml^{-1}$.

In various embodiments, the concentration of the New-Dehli metallo-β-lactamase 1 into the aqueous medium is of 300 $\mu g \cdot ml^{-1}$.

In various embodiments, the incubation step is performed at room temperature and under agitation, in various instances at 30, 50, 100, 200 and 300 rpm, for example at 100 rpm.

In various embodiments, the incubation step is performed during 1 hour.

In various embodiments, the aqueous medium comprises deionized water.

In various embodiments, the aqueous medium further comprises 4-(2-hydroxyethyl)-1-piperazineethanesulfonic acid (HEPES) as a buffering agent at a concentration of 12.5 mM.

In various embodiments, the step of measuring the evolution of the concentration of the at least one antibiotic is performed by UV absorbance measurements or by liquid chromatography/tandem mass spectrometry.

All features of the above described aspects of the invention may be combined or replaced with one another.

DRAWINGS

In the following, the present disclosure describes the figures according to the embodiments of the present invention. Further details are given in the detailed description of the embodiments. The figures have the purpose of illustrating the invention and should not be understood in a limiting sense.

FIG. 1a, without Tween 20; FIG. 1b, with Tween 20 (5%) after 196 h of contact with microorganisms solution (*Aspergillus nidulans* and *Pseudomonas aeruginosa*).

FIG. 2a, without Tween 20; FIG. 2b, with Tween 20 (5%) after 196 h of contact with microorganisms solution (*Aspergillus nidulans* and *Pseudomonas aeruginosa*).

FIG. 3a, without Tween 20; FIG. 3b, with Tween 20 (5%) after 196 h of contact with microorganisms solution (*Aspergillus nidulans* and *Pseudomonas aeruginosa*).

FIG. 4a, without Tween 20; FIG. 4b, with Tween 20 (5%) after 196 h of contact with microorganisms solution (*Aspergillus nidulans* and *Pseudomonas aeruginosa*).

DETAILED DESCRIPTION

The following description is merely exemplary in nature and is in no way intended to limit the present teachings, application, or uses.

The immobilization on enzyme on solid support is useful because it enhances the properties of the enzyme. For instance, the following advantages can be demonstrated:

1) autolysis of the enzyme is limited or considerably slowed,
2) the enzyme are protected towards the chemical and biological environment in which the support is placed,
3) the lifespan of the enzyme is increased and,
4) the activity of the enzyme is increased.

The last feature (increase of the enzymatic activity) is probably due to the fact that, firstly, the enzyme is more stable when it is grafted on a solid support because of an increased rigidity, and that, secondly, there are more enzymes disposed to react with one substrate. On the solid support, the enzyme are in a configuration ready to perform the enzymatic reaction, while in the bulk, some enzymes can be in an activated state while some other are not activated.

New-Dehli metallo-β-lactamase 1 (NDM-1) is an enzyme belonging to the metallo-β-lactamase family. It is encoded by the $bla_{ndm-1}$ gene which was isolated from bacteria causing multi-resistance problems in hospital infections. Indeed, this enzyme is considered as a carbapenemase. Studies from Kumarasamy K. K. et al. (*Lancet Infect. Dis.*, 2010, 10, 597-602) have shown that *Klebsiella pneumonia* NDM-1 positive strain or *Escherichia coli* NDM-1 positive strain are highly resistant to all antibiotics tested except tigecycline and colistin.

*Pseudomonas aeruginosa* is a very prevalent nosocomial bacterium. β-lactamase extracted from this bacterium provide a large panel of mechanisms confering resistance to antibiotics, as shown in the studies of Livermore D. M. (*Antimicrobial Resistance*, 2002, 34, 634-640).

These above mentioned negative features of the NDM-1 and the β-lactamase extracted from *Pseudomonas aeruginosa* could be thus employed to degrade the β-lactam antibiotics found in an aqueous medium.

Studies from Migliorie L. et al. (*Journal of Hazardous Materials*, 2012, 215-216, 227-232) demonstrate that oxytetracycline (OTC) can be biodegraded by the crude laccase *Pleurotus ostreatus*. The laccase in its purified form, namely extracted from the fungus, is nevertheless unable to degrade OTC in the absence of mycelia.

The invention comprises therefore in immobilizing the New-Dehli metallo-β-lactamase 1 (NDM-1), the laccase extracted from *Pleurotus ostreatus* and/or the β-lactamase extracted from *Pseudomonas aeruginosa* on a particular solid support.

The solid support on which the enzyme(s) is/are immobilized is a moving bed carrier. The moving bed carrier is adapted for being used in a moving bed reactor.

Indeed, moving bed reactors, implying moving bed carriers such as Kaldnes carriers as described in European patent published EP 0 575 314 B1, could be used to reduce the risk of clogging that are inherent to the use of packed-be reactors.

International patent application published WO 2013/149662 A1 discloses moving bed biofilm carriers having the shape of Kaldnes-like carriers and inoculated with one or more microbial strain(s). These carriers are used in moving bed biofilm reactor (MBBR). The main role of the carriers in a MBBR is to provide a support for the growth of microorganism communities on their surface. The carriers offer an optimal solution in terms of the ratio between the volume and the surface which are available for the growth of the microorganisms on the carrier itself. The Kaldnes-like carriers are also made of biodegradable material, such as bioplastics, and are therefore a carbon source for the growing microorganism.

In various instances the carriers composing the moving bed reactor are in high-density polyethylene, such as a Kaldnes biochip.

For comparison purposes, the above mentioned enzymes will be also anchored on other solid support, such as Type 304 Stainless Steel Mirror or Nylon Polyamide Membrane.

The Kaldnes carriers are shaped like a disk with a three-dimensional checkering inside the disk and fins on the outside.

The surface area is equivalent to 75 $cm^2$. The surface area of the Type 304 Stainless Steel Mirror is equivalent to 3.14 $cm^2$.

The surface area of the Nylon Polyamide Membrane is equivalent to 2.25 $cm^2$.

Functionalization of the Solid Support

The Kaldnes carriers are bioactivated with the enzymes through resistant covalent bonds. Prior to enzyme immobilization, the surface of the Kaldnes carriers are functionalized.

The surface treatment of the Kaldnes carriers can be performed through the deposition of a functionalized layer by cold plasma deposition method at atmospheric pressure, for example with the use of glycidyl methacrylate to generate an epoxy-functionalized polyglycidyl methacrylate (PGMA) layer.

The surface treatment of the Kaldnes carriers can be performed through the deposition of a functionalized layer by cold plasma deposition method at atmospheric pressure, for example with the use of glycidyl methacrylate to generate an epoxy-functionalized polyglycidyl methacrylate (PGMA) layer. The surface treatment of the Kaldnes carriers can also be performed by coating, in various instances by an auto-polymerization process, for example by auto-polymerization of dopamine. For example, the auto-polymerization process can be performed by dipping the Kaldnes carriers under stirring (at 150 rpm) into a solution (at pH=8.5) comprising dopamine hydrochloride (2 mg·ml$^{-1}$) and tris (hydroxymethyl)aminomethane hydrochloride—Tris-HCl (10 mM). After 4 hours of agitation, the carriers are rinsed 5 times with MilliQ® water, dried and stored at 4° C. The resulting functionalized surfaces present reactive quinone groups.

Biofunctionalization of the Activated Carriers

These active surfaces can subsequently be bioconjugated with the enzyme (NDM-1, laccase extracted from *Pleurotus ostreatus*, and/or β-lactamase extracted from *Pseudomonas aeruginosa*). The enzymes are anchored by covalent binding through reaction with functional groups. This ensures the strong anchoring of the enzyme to the surface. It is also possible that weaker interactions (non-covalent binding) between the enzyme and the surface are involved. To perform the immobilization process, the enzymes are solubilized into a buffer solution. The buffer solution is phosphate buffered saline (PBS) at and enzyme is added at a final concentration of 1 mg·ml$^{-1}$. Then the functionalized Kaldnes carriers are added to this incubating solution and the functionalization (i.e., the formation of the peptide bonds) is achieved after stirring at 100 rpm during 1 hour. Then, the solid supports are rinsed five times with PBS and dried.

With the use of dopamine as layer precursor, the biofunctionalization of the solid support by the enzyme is possible only with the Kaldnes carriers. No enzyme has been successfully grafted on the Type 304 Stainless Steel Mirror, although those surfaces have been functionalized with dopamine.

It has to be noted that the carriers can be biofunctionalized with several different enzymes, for example with the laccase extracted from *Pleurotus ostreatus* and with the β-lactamase extracted from *Pseudomonas aeruginosa*.

Saturation of the Carriers with Tween 20

The bioactivated Kaldnes carriers are further saturated with a microorganisms anti-adhesion layer. The microorganisms anti-adhesion layers comprises Tween 20 and has for function to limit the adhesion of microorganisms on the surface of the bioactivated Kaldnes carriers.

The purpose of this saturation step is to protect the enzyme towards unwanted metabolism by microorganisms. The purpose of this saturation step is also to protect the enzyme towards inhibition/neutralization provoked by microorganisms accumulation.

Quantitation and Distribution of the Proteins

Protein quantitation is performed on the bioactivated Kaldnes carriers by a colorimetric assay. The colorimetric assay is the RC DC™ (Reducing agent and Detergent Compatible) Protein Assay available from Bio-Rad. The assay is achieved by back titration on the incubating solution containing the solubilized enzyme. Determination of the distribution of the enzymes on the bioactivated Kaldnes carriers is also performed. The test is the LavaPurple™ test, which is a deep purple total protein stain using the reversible fluorescent staining process of enzymes with epicocconone and is available from GE Healthcare Life Sciences. In the present case, this LavaPurple™ test is used to map the surface of the biochips by staining the immobilized enzymes.

The LavaPurple™ test was also employed to determine the resistance of the biofunctionalized carriers to laminar flow of water.

Measure of Enzymatic Activity

Once the Kaldnes carriers have been activated according to the above protocol, the enzymatic activity is measured. Two antibiotics present in an aqueous medium have been tested. An antibiotic chosen from the class of β-lactam antibiotics, namely amoxicillin, and an antibiotic chosen from the class of sulfonamide antibiotics, namely sulfamethoxazole, have been used to determine the potential of the bioactivated Kaldnes carriers.

A sample of tap water, prealably filtered on a syringe filter unit (disposable pore size of 0.22 μm) and with HEPES (12.5 mM), and the antibiotics at a concentration of 100 μg/ml.

For comparison purposes, degradation of the antibiotic with the free enzyme will be tested. The sample of tap water, prealably filtered on a syringe filter unit (disposable pore size of 0.22 μm) and with HEPES (12.5 mM), and the antibiotics at a concentration of 100 μg·ml$^{-1}$, is prepared.

UV absorbance measurements are achieved to determine the evolution of the concentration of the antibiotics. Amoxicillin is a compound which absorbs at 210 nm and sulfamethoxazole is a compound which absorbs at 260 nm. The absorbance, and the thus the concentration, is determined every 24 hours.

Results

The following tables identify the results of the different experiments regarding the degradation of the antibiotics.

TABLE I

Amount of degraded amoxicillin when β-lactamase extracted from *Pseudomonas aeruginosa* is employed (PGMA based layer).

| | Solid support | Tween 20 (5%) | Amount of enzyme (mg) | Duration of activity (days) | Amount of degraded amoxicillin (μg) |
|---|---|---|---|---|---|
| 1 | Type 304 Stainless Steel Mirror | No | 0.240 ± 0.005 | 12 | 72 ± 9 |
| 2 | / | No | 0.240 ± 0.001 | 2 | 50 ± 9 |
| 3 | Kaldnes | No | 2.2 ± 0.1 | 11 | 955 ± 63 |
| 4 | / | No | 2.2 ± 0.05 | 2 | 79 ± 2 |
| 5 | Type 304 Stainless Steel Mirror | Yes | 0.246 ± 0.0008 | 16 | 117 ± 2 |
| 6 | Kaldnes | Yes | 2 ± 0.01 | 24 | 1240 ± 50 |

The experiments were repeated 3 times for Kaldnes biochips and 9 times for the steel mirror. The amount of degraded amoxicillin corresponds to the total quantity of degraded amoxicillin integrated across the whole duration of activity.

Table I clearly indicates that when the enzyme β-lactamase extracted from *Pseudomonas aeruginosa* is anchored via PGMA based layer that was applied on the solid support by cold plasma coating at atmospheric pressure, the amount of immobilized enzyme was about 10 times more important on the Kaldnes carrier than on another support (i.e. Type 304 Stainless Steel Mirror).

The amount of degraded antibiotics also raised significantly when the enzyme is immobilized on the Kaldnes carrier.

Indeed, by using Kaldnes support, a concentration of amoxicillin 12 times higher than when using the enzyme in its free form has been degraded (see entries 3 and 4). By comparison, the use of steel support did not improve the degradation process of the antibiotic in regard with the use of the free enzyme (entries 1 and 2).

The amount of free enzyme which has been studied corresponds to the amount of the enzyme which has been immobilized on the solid support and determined by back titration of the incubation solution during the biofunctionalization of the solid supports.

This shows the efficacy of the Kaldnes carrier to enhance the enzymatic degradation of amoxicillin.

The presence of Tween 20 with the β-lactamase on the Kaldnes carrier has for effect to increase the time of activity of the bioactivated solid support.

With the laccase, the immobilization is an important parameter to enhance the activity of the enzyme. Indeed, the enzyme when used in its free form, does not give a high level of degraded antibiotics.

The presence of Tween 20 with the laccase on the Kaldnes carrier has for effect to increase the time of activity of the bioactivated solid support.

TABLE III

Amount of degraded amoxicillin when β-lactamase extracted from *Pseudomonas aeruginosa* is employed (dopamine as layer precursor).

| | Solid support | Tween 20 (5%) | Amount of enzyme (mg) | Duration of activity (days) | Amount of degraded amoxicillin (μg) |
|---|---|---|---|---|---|
| 1 | Kaldnes | No | 1.5 ± 0.1 | 13 | 2260 ± 18 |
| 2 | Kaldnes | Yes | 1.38 ± 0.03 | 17 | 2502 ± 110 |
| 3 | / | No | 1.5 ± 0.05 | 3 | 279 ± 31 |

The experiments were repeated 3 times. The amount of degraded amoxicillin corresponds to the total quantity of degraded amoxicillin integrated across the whole duration of activity.

Table III clearly indicates that amoxicillin is degraded about 8 to 9 times more efficiently when the β-lactamase is immobilized on Kaldnes carriers than when the β-lactamase is used in its free form.

The presence of a microorganisms anti-adhesion layer also enhances the degradation reaction performed by the immobilized enzyme.

TABLE II

Amount of degraded sulfamethoxazole when laccase extracted from *Pleurotus ostreatus* is employed (PGMA based layer).

| | Solid support | Tween 20 (5%) | Amount of enzyme (mg) | Duration of activity (days) | Amount of degraded sulfamethoxazole (μg) |
|---|---|---|---|---|---|
| 1 | Type 304 Stainless Steel Mirror | No | 0.039 ± 0.008 | 12 | 244 ± 18 |
| 2 | / | No | 0.040 ± 0.005 | 2 | 120 ± 5 |
| 3 | Kaldnes | No | 5.8 ± 0.02 | 11 | 2376 ± 100 |
| 4 | / | No | 5.7 ± 0.008 | 2 | 183 ± 10 |
| 5 | Type 304 Stainless Steel Mirror | Yes | 0.038 ± 0.0005 | 27 | 761 ± 88 |
| 6 | Kaldnes | Yes | 5.6 ± 0.1 | 27 | 6562 ± 363 |

The experiments were repeated 3 times for Kaldnes biochips and 9 times for the steel mirror. The amount of degraded sulfamethoxazole corresponds to the total quantity of degraded sulfamethoxazole integrated across the whole duration of activity.

Table II clearly indicates that when the enzyme laccase extracted from *Pleurotus ostreatus* is anchored via a PGMA based layer that was applied on the solid support by cold plasma coating at atmospheric pressure, the amount of immobilized enzyme was about 150 times more important on the Kaldnes carrier than on another support (i.e. Type 304 Stainless Steel Mirror). The amount of degraded antibiotics also raised significantly when the enzyme is immobilized on the Kaldnes carrier.

TABLE IV

Amount of degraded sulfamethoxazole when laccase extracted from *Pleurotus ostreatus* is employed (dopamine as layer precursor).

| | Solid support | Tween 20 (5%) | Amount of enzyme (mg) | Duration of activity (days) | Amount of degraded sulfamethoxazole (μg) |
|---|---|---|---|---|---|
| 1 | Kaldnes | No | 2.15 ± 0.1 | 15 | 5717 ± 193 |
| 2 | Kaldnes | Yes | 2.01 ± 0.05 | 19.8 | 6101 ± 43 |
| 3 | / | No | 2.1 ± 0.010 | 3 | 1090 ± 56 |

The experiments were repeated 3 times. The amount of degraded sulfamethoxazole corresponds to the total quantity of degraded sulfamethoxazole integrated across the whole duration of activity.

Similarly to the results obtained when the β-lactamase is employed, table IV clearly indicates that amoxicillin is degraded about 8 to 9 times more efficiently when the laccase is immobilized on Kaldnes carriers than when the laccase is used in its free form.

The presence of a microorganisms anti-adhesion layer also enhances the degradation reaction performed by the immobilized enzyme.

TABLE V

Amount of degraded amoxicillin when New-Dehli metallo-β-lactamase 1 (NDM-1) immobilized on Kaldnes biochips is employed.

| | Comments | Tween 20 (5%) | Amount of enzyme (mg) | Duration of activity (days) | Amount of degraded amoxicillin (µg) |
|---|---|---|---|---|---|
| 1 | dopamine as layer precursor | No | 1.985 ± 0.1 | 10 | 3021 ± 51 |
| 2 | PGMA based layer | Yes | 1.985 ± 0.1 | 22 | 3502 ± 191 |
| 3 | enzyme in its free form | No | 2 ± 0.08 | 4 | 390 ± 45 |

The experiments were repeated 3 times. The amount of degraded amoxicillin corresponds to the total quantity of degraded amoxicillin integrated across the whole duration of activity.

Table V indicates the results obtained when NDM-1 has been immobilized on the Kaldnes carrier. When NDM-1 is immobilized, the amount of amoxicillin which is degraded is about 8 times more important than when the enzyme is used in its free form.

An interesting feature of the NDM-1 enzyme was further discovered. In fact, not only amoxicillin (a β-lactam antibiotic) can be degraded but also several other antibiotics belonging to other antibiotic families.

To demonstrate these novel properties of the NDM-1 enzyme, a bacteria *E. coli* of the type BL21 2D3 have been transformed with the poPINF plasmid containing the gene encoding *K. pneumoniae* NDM-1. The production of protein performed as described by Green V. L. et al. (*Acta Crystallogr.* 2011, F67, 1160-1164) with few modifications: An additional step of freezing is added before cell lysis with French press. The NDM-1 isolation and purification are only performed with HisTrap FF column (GE Healthcare). Three washes in Amicon® Ultra-4 Centrifugal Filter Units 3,000 NMWL (1000×g for 15 min) allow to remove excess imidazole. Enzymes are then re-suspended in PBS.

Degradation experiments have been performed, using a concentration of free NDM-1 enzyme of 300 $\mu g \cdot ml^{-1}$ in an aqueous medium comprising deionized water and HEPES 12.5 mM. Antibiotic is added at final concentration of 100 $\mu g \cdot ml^{-1}$ (final volume: 1 mL). Degradation assay are performed under agitation of 100 rpm at room temperature during 1 hour. UV absorbance measurements are achieved to determine the evolution of the concentration of the antibiotics in the medium.

TABLE VI

List of antibiotics degraded by the enzyme NDM-1.

| | antibiotic | family | degraded amount after 1 hour (µg) | Autolysis of antibiotic after 1 hour (µg · ml⁻¹) |
|---|---|---|---|---|
| 1 | amoxicillin | penicillin (β-lactam) | 10 ± 2 | 0 |
| 2 | imipenem | carbapanem (β-lactam) | 9 ± 1.4 | 0 |
| 3 | bacitracin | polypeptide | 5 ± 0.8 | 0 |
| 4 | lincomycin | lincosanide | 5 ± 1.5 | 0.01 |
| 5 | oxytetracycline | tetracycline | 4.1 ± 2.1 | 0.02 |
| 6 | sulfamethoxazole | sulfonamide | 3.2 ± 0.8 | 0 |
| 7 | trimethoprime | sulfonamide | 2.5 ± 0.95 | 0.01 |
| 8 | tylosine | macrolide | 7.4 ± 1.1 | 0.01 |
| 9 | erythromycin | macrolide | 6.8 ± 2.3 | 0 |

The experiments were repeated 4 times.

The results indicate that NDM-1 is capable to degrade 9 antibiotics belonging to 6 different families. Not only β-lactams (entries 1 and 2) can be degraded, but also polypeptide, lincosanide, tetracycline, sulfonamide and macrolide antibiotics.

The Kaldnes carriers can further be functionalized by several enzymes, according to the same protocol as explained above. The antibiotic which is studied when both the β-lactamase and the laccase are used together is amoxicillin.

TABLE VII

Amount of degraded amoxicillin when both β-lactamase (Lact.) extracted from *Pseudomonas aeruginosa* and laccase (Lacc.) extracted from *Pleurotus ostreatus* are employed (PGMA based layer).

| | Solid support | Tween 20 (5%) | Amount of enzyme (mg) | Time of activity (days) | Amount of degraded amoxicillin (µg) |
|---|---|---|---|---|---|
| 1 | Kaldnes | No | Lacc: 5.6 ± 0.02 Lact: 2.2 ± 0.1 | 24 | 1925 ± 85 |
| 2 | Kaldnes | Yes | Lacc: 6.8 ± 0.2 Lact: 2 ± 0.01 | 27 | 2239 ± 41 |

The experiments were repeated 3 times.

TABLE VIII

Amount of degraded amoxicillin when both β-lactamase (Lact.) extracted from *Pseudomonas aeruginosa* and laccase (Lacc.) extracted from *Pleurotus ostreatus* are employed (dopamine as layer precursor).

| | Solid support | Tween 20 (5%) | Amount of enzyme (mg) | Time of activity (days) | Amount of degraded amoxicillin (µg) |
|---|---|---|---|---|---|
| 1 | Kaldnes | No | Lacc: 2.15 ± 0.09 Lact: 1.5 ± 0.1 | 15.4 | 2623 ± 107 |
| 2 | Kaldnes | Yes | Lacc: 2.01 ± 0.05 Lact: 1.38 ± 0.03 | 20.8 | 3101 ± 95 |

The experiments were repeated 3 times.

Results with Substrate-Limiting Conditions

The results presented in the preceding tables concerned the results of the antibiotics degradation in an aqueous medium at a concentration of 100 $\mu g \cdot ml^{-1}$. This concentration is 1000 times higher than the concentration which can be found in aqueous medium belonging to the natural environment.

In practice, the Kaldnes carriers of the present invention are designed to be effective to treat aqueous medium which is notably industrial wastewater, recycled process water, pharmaceutical plant wastewater, municipal wastewater, sanitary wastewater, sewage, sludge, farm wastewater, animal farm wastewater, fish farm wastewater, agricultural site wastewater, hospital wastewater, medical center wastewater, nursing home wastewater, urban wastewater, collective wastewater, wastewater treatment plant effluents or agricultural manure.

The Kaldnes carriers biofunctionalized with one or several enzymes were thus tested in a medium containing a concentration of 100 ng·ml$^{-1}$ (i.e., 1000 times less of antibiotics than in the precedent experiments).

It is known that an enzymatic reaction is limited by a minimal concentration under which the probability of the interaction between the enzyme and substrate is zero. The concentration below the minimal concentration cannot be treated by the system. However, if the amount of enzyme is increased in the media, by means for example of increasing the number of bioactived biochips or carriers, the treatment of media containing only of weak dose of antibiotic (i.e. 100 ng·ml$^{-1}$) could be treated.

The detection of the concentration of the antibiotics at this weak dose is achieved by liquid chromatography-tandem mass spectrometry (LC/MS-MS).

TABLE IX

Amount of degraded antibiotics (Ab) when a weak concentration of antibiotics is used (layer precursor: dopamine; solid support: Kaldnes biochips)

| | Immobilized enzyme | Number of functionalized Kaldnes carrier | Amount of enzyme (mg) | Initial amount of antibiotics (ng · ml$^{-1}$) | Yield of degradation Ab |
|---|---|---|---|---|---|
| 1 | β-lactamase | 7 | 10.5 | 191 | >99.5% |
| 2 | laccase | 7 | 15.1 | 84.8 | 94.4% |
| 3 | β-lactamase + laccase | Lacc. 4 Lact. 3 | Lacc. 6.45 Lact. 6 | 191 | >99.5% |

The experiments were repeated 3 times.

These above results indicates that when several bioactivated Kaldnes carriers are used together (for example, 7 biochips together), the whole system is able to degrade a weak dose of antibiotics.

The tests are performed at room temperature with an agitation of 100 rpm during 1 hour.

The antibiotic which is studied when the β-lactamase is used is amoxicillin.

The antibiotic which is studied when the laccase is used is sulfamethoxazole.

The antibiotic which is studied when both the β-lactamase and the laccase are used together is amoxicillin.

Effect of Tween 20

The effect of the presence of Tween 20 (polysorbate 20) was further studied in details with bioactivated Kaldnes biochips.

A solution comprising a fungi *Aspergillus nidulans* and a bacterium *Pseudomonas aeruginosa* were prepared. The biological cultures are centrifuged and washed twice into PBS. The supernatants were eliminated and the pellets were suspended into PBS. The suspended pellets were incubated with the bioactivated Kaldnes biochips to test the adherence of the microorganisms onto these bioactivated Kaldnes biochips. The incubation is performed without agitation to favor the adhesion and is performed during 196 hours.

The adherence was checked by scanning electron microscopy (SEM) analysis.

Figure 1:
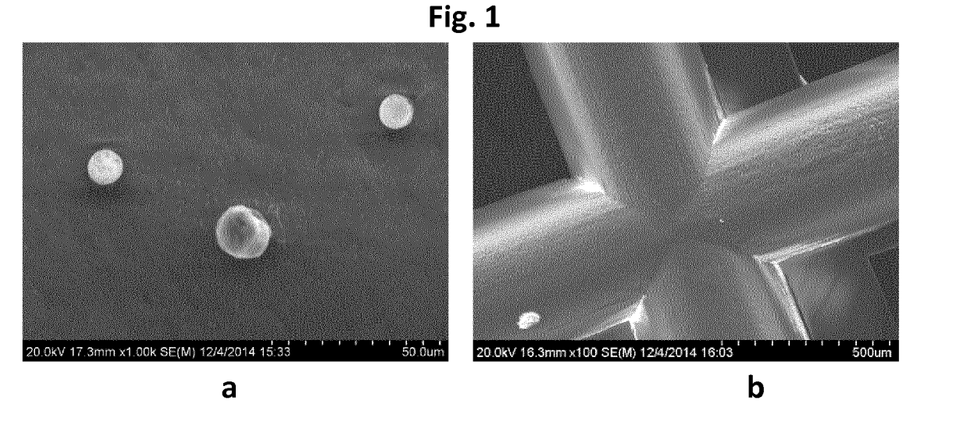
FIG. 1 is an image obtained by Scanning electron microscopy (SEM) of Kaldnes biochips biofunctionalized with β-lactamase extracted from *Pseudomonas aeruginosa* (PGMA based layer)
Figure 3:
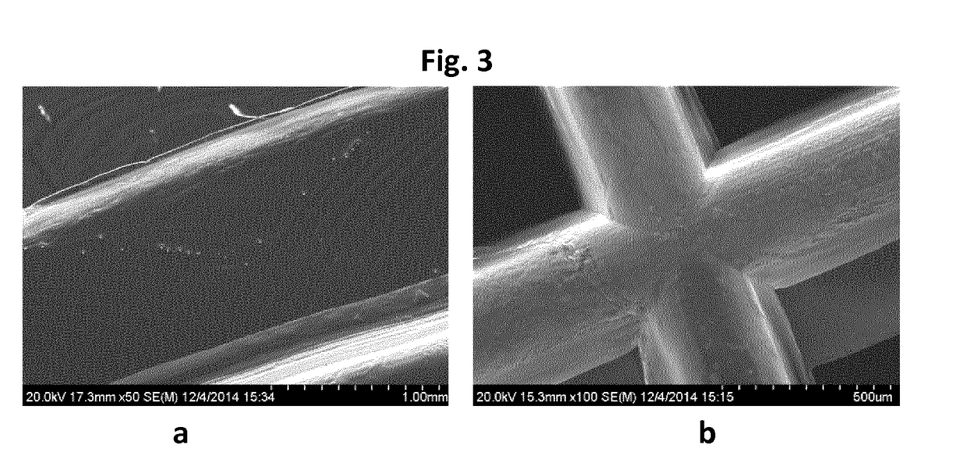
FIG. 3 is an image obtained by SEM of Kaldnes biochips biofunctionalized with laccase extracted from *Pleurotus ostreatus* (PGMA based layer)

On the one hand, FIGS. 1 (Kaldnes biochips bionfunctionalized with □-lactamase extracted from *Pseudomonas aeruginosa*) and 3 (Kaldnes biochips bionfunctionalized with laccase extracted from *Pleurotus ostreatus*) demonstrate that when a PGMA based layer is employed to functionalize the Kaldnes biochips, the surfaces saturation with the Tween 20 is essential to prevent *Aspergillus nidulans* adhesion. No adhesion of the bacteria *Pseudomonas aeruginosa* is observed with or without Tween 20 surfaces saturation.

Figure 2:
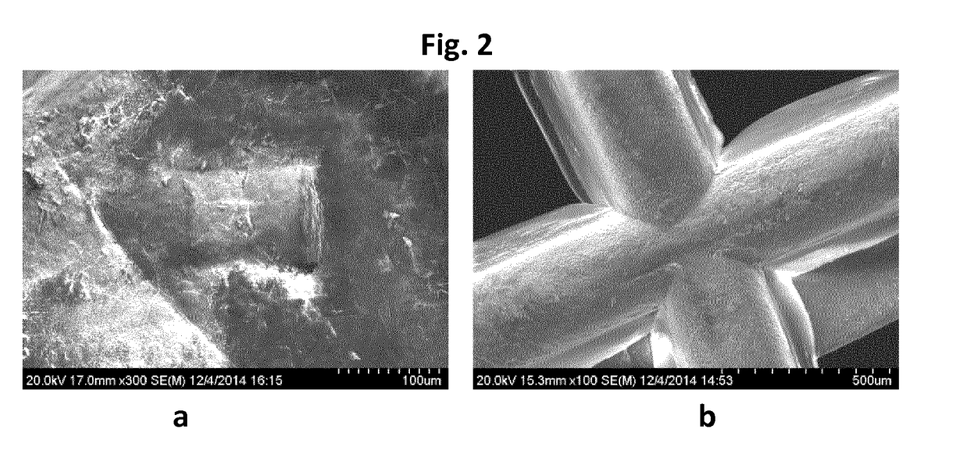
FIG. 2 is an image obtained by SEM of Kaldnes biochips biofunctionalized with β-lactamase extracted from *Pseudomonas aeruginosa* (dopamine as layer precursor)
Figure 4:
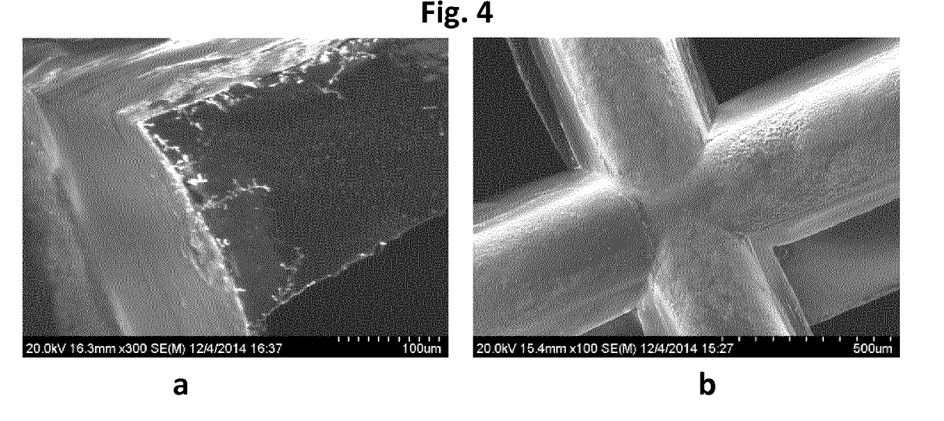
FIG. 4 is an image obtained by SEM of Kaldnes biochips biofunctionalized with laccase extracted from *Pleurotus ostreatus* (dopamine as layer precursor)

On the other hand, FIGS. 2 (□-lactamase extracted from *Pseudomonas aeruginosa*) and 4 (laccase extracted from *Pleurotus ostreatus*) demonstrate that when dopamine as layer precursor is employed to functionalize the Kaldnes biochips, the saturation surfaces with Tween 20 is required to prevent the adhesion of the fungi *Aspergillus nidulans* on the surface. No adhesion of the bacteria *Pseudomonas aeruginosa* is observed with or without Tween 20 surfaces saturation.

Similar results were obtained with solid support of Type 304 Stainless Steel Mirror functionalized with PGMA or auto-polymerized dopamine. The incubation was also performed without agitation to favor the adhesion and was performed during 96 hours.

Resistance to Water Flux

The solid supports (Kaldnes carrier or Type 304 Stainless Steel Mirror) have been tested to laminar flow of water. The flow was 30 km·h$^{-1}$. The LavaPurple™ test was used to map the surfaces of the solid supports after a certain amount of time.

Antibiotics degradation tests were performed onto the carriers to measure the activity after the test to laminar flow.

For the supports functionalized with PGMA, the tests were performed after 10 days.

For the supports functionalized with dopamine, the tests were performed after 6 days.

In all cases, it has been observed that the activity of the biochips has been preserved.

Storage of the Kaldnes Carriers

The biofunctionalized Kaldnes carriers, after being dried, have been kept in the fridge at 4° C. Antibiotics degradation tests were performed onto the carriers to measure the activity.

TABLE X

Length of preservation of Kaldnes carriers functionalized with PGMA at 4° C.

| | Kaldnes + PGMA | Kaldnes + PGMA + enzyme | Kaldnes + PGMA + enzyme + Tween 20 |
|---|---|---|---|
| β-lactamase | 1 month | 3 months | 2 weeks |
| laccase | 1 month | 4 months | 1 month |
| NDM-1 | 1 month | 2 months | 2 weeks |

TABLE XI

Length of preservation of Kaldnes carriers functionalized with dopamine at 4° C.

|  | Kaldnes + dopamine | Kaldnes + dopamine + enzyme | Kaldnes + dopamine + enzyme + Tween 20 |
|---|---|---|---|
| β-lactamase | 1 month | 2 months | 2 weeks |
| laccase | 1 month | 3 months | 1 month |
| NDM-1 | 3 weeks | 1 month | 2 weeks |

In both cases (Tables X and XI), it has been observed that the Kaldnes carriers biofunctionalized with the enzymes preserve the enzymatic activity for the antibiotic degradation reaction.

Evaluation of the Toxicity of the Products Generated by the Degradation

The toxicity of generated secondary metabolites is estimated by ecotoxicity tests to prove the ability of the process to degrade and inactivate antibiotics.

For this, the tests were carried out on the degradation media before (T0) and after metabolization by enzymes immobilized on PGMA and DOPA functionalized Kaldnes after 30 min, 1 h and 24 h of contact.

The toxicity of the supernatants was estimated by performing the following tests:

Acute toxicity test on microalgae *Selenastrum capricornutum* according to ISO 8692: 2012 Water quality—Growth inhibition test on freshwater algae with unicellular green algae.

*Daphnia* acute toxicity test according to ISO 6341: 2012 Water quality—Determination of the inhibition of the mobility of *Daphnia magna* Straus (Cladocera, Crustacea)—Acute toxicity test.

Non-specific toxicity test on bacteria: Microtox according to EN ISO 11348-3 Water quality—Determination of the inhibitory effect of water samples on the light issuance of *Vibrio fischeri* (Luminescent bacteria test).

Cytotoxicity test on rat hepatoma cell line H4IIE.Luc: Cell Viability Assay AlamarBlue®.

The tests are performed with the maximum volume of test solution that can be provided and defined by the standards cited earlier. The results are expressed as a percentage of growth inhibition for algae and *Daphnia* test, as percentage of light emission inhibition for the Microtox test and as percentage of cell viability inhibition for cytotoxicity tests.

TABLE XII

Evolution of toxicity during the degradation of amoxicillin degraded by β-lactamase extracted from *Pseudomonas aeruginosa*.

| | Acute toxicity test | Concentration of antibiotic in the test medium at T0 ($\mu g \cdot mL^{-1}$) | Percentage of inhibition (%) | | | |
|---|---|---|---|---|---|---|
| | | | T0 | T = 30 min | T = 1 h | T = 24 h |
| 1 | Alga test | 90 | 55 ± 6 | 53 ± 8 | 37 ± 5 | 0 |
| 2 | Daphnia Test | 90 | 56 ± 4 | 52 ± 4 | 31 ± 3 | 0 |
| 3 | Microtox | 80 | 41 ± 12 | 42 ± 8 | 36 ± 5 | 10 ± 4 |
| 4 | Cell Viability Assay | 80 | 19 ± 5 | 18 ± 5 | 5 ± 2 | 5 ± 1 |

TABLE XIII

Evolution of toxicity during the degradation of amoxicillin degraded by β-lactamase extracted from *Pseudomonas aeruginosa* and by laccase extracted from *Pleurotus ostreatus*.

| | Acute toxicity test | Concentration of antibiotic in the test medium at T0 ($\mu g \cdot mL^{-1}$) | Percentage of inhibition (%) | | | |
|---|---|---|---|---|---|---|
| | | | T0 | T = 30 min | T = 1 h | T = 24 h |
| 1 | Alga test | 90 | 55 ± 6 | 22 ± 5 | 0 | 0 |
| 2 | Daphnia Test | 90 | 56 ± 4 | 54 ± 5 | 28 ± 6 | 0 |
| 3 | Microtox | 80 | 41 ± 12 | 40 ± 6 | 27 ± 5 | 3 ± 0.5 |
| 4 | Cell Viability Assay | 80 | 19 ± 5 | 13 ± 3 | 8 ± 3 | 0 |

TABLE XIV

Evolution of toxicity during the degradation of amoxicillin degraded by New-Dehli metallo-β-lactamase 1 (NDM-1).

| | Acute toxicity test | Concentration of antibiotic in the test medium at T0 ($\mu g \cdot mL^{-1}$) | Percentage of inhibition (%) | | | |
|---|---|---|---|---|---|---|
| | | | T0 | T = 30 min | T = 1 h | T = 24 h |
| 1 | Alga test | 90 | 55 ± 6 | 41 ± 4 | 30 ± 6 | 0 |
| 2 | Daphnia Test | 90 | 56 ± 4 | 54 ± 5 | 21 ± 10 | 0 |
| 3 | Microtox | 80 | 41 ± 12 | 42 ± 9 | 24 ± 3 | 8 ± 1 |
| 4 | Cell Viability Assay | 80 | 19 ± 5 | 18 ± 6 | 9 ± 2 | 0 |

TABLE XV

Evolution of toxicity during the degradation of amoxicillin degraded by New-Dehli metallo-β-lactamase 1 (NDM-1) and by laccase extracted from *Pleurotus ostreatus*.

| | Acute toxicity test | Concentration of antibiotic in the test medium at T0 ($\mu g \cdot mL^{-1}$) | Percentage of inhibition (%) | | | |
|---|---|---|---|---|---|---|
| | | | T0 | T = 30 min | T = 1 h | T = 24 h |
| 1 | Alga test | 90 | 55 ± 6 | 35 ± 2 | 0 | 0 |
| 2 | Daphnia Test | 90 | 56 ± 4 | 43 ± 8 | 0 | 0 |
| 3 | Microtox | 80 | 41 ± 12 | 25 ± 9 | 18 ± 4 | 4 ± 0.8 |
| 4 | Cell Viability Assay | 80 | 19 ± 5 | 17 ± 5 | 5 ± 3 | 0 |

TABLE XVI

Evolution of toxicity during the degradation of sulfamethoxazole degraded by laccase extracted from *Pleurotus ostreatus*.

| | Acute toxicity test | Concentration of antibiotic in the test medium at T0 ($\mu g \cdot mL^{-1}$) | Percentage of inhibition (%) | | | |
|---|---|---|---|---|---|---|
| | | | T0 | T = 30 min | T = 1 h | T = 24 h |
| 1 | Alga test | 90 | 51 ± 5 | 23 ± 5 | 0 | 0 |
| 2 | Daphnia Test | 90 | 50 ± 5 | 51 ± 6 | 27 ± 5 | 0 |
| 3 | Microtox | 80 | 45 ± 10 | 52 ± 8 | 24 ± 6 | 11 ± 2 |
| 4 | Cell Viability Assay | 80 | 15 ± 4 | 16 ± 5 | 7 ± 2 | 0 |

The results (tables XII to XVI) show that in all cases and for all tests, toxicity after degradation of the antibiotic decreases, which indicates that the generated metabolites do not generate higher toxicity than the parent compounds and/or cytotoxicity.

The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof.

In any case the above described embodiments shall not be understood in a limiting sense. In particular, the features of the above embodiments may also be replaced or combined with one another.

The invention claimed is:

1. A method for degrading and inactivating at least one xenobiotic, the at least one xenobiotic being present in an aqueous medium, said method comprising:
   grafting at least one enzyme onto a solid support;
   incubating the solid support with the at least one enzyme in the aqueous medium; and measuring the evolution of the concentration of the at least one xenobiotic,
wherein the at least one enzyme is at least one of a New-Delhi metallo-β-lactamase 1, a laccase extracted from *Pleurotus ostreatus* and a β-lactamase extracted from *Pseudomonas aeruginosa*, and wherein the solid support is a moving bed carrier.

2. The method according to claim 1 wherein the moving bed carrier is in high-density polyethylene.

3. The method according to claim 1, wherein the moving bed carrier is a biochip carrier shaped like a disk with a three-dimensional checkering inside the disk and fins at the outside.

4. The method according to claim 1, wherein the moving bed carrier is activated with at least one precursor prior to the grafting of at least one enzyme wherein the activation step is performed by surface treatment, with the at least one precursor of said moving bed carrier by one of cold plasma deposition at atmospheric pressure, and coating, the coating being an auto-polymerization process.

5. The method according to claim 4, wherein the at least one precursor is one of polyglycidyl methacrylate, dopamine, maleic anhydride/vinyltrimethoxysilane, and dopamine acrylamide/vinyltrimethoxysilane.

6. The method according to claim 1, wherein the method further comprises saturating the solid support by a microorganisms anti-adhesion layer after the grafting of the at least one enzyme onto the solid support.

7. The method according to claim 6, wherein the microorganisms anti-adhesion layer comprises polyoxyethylene (20) sorbitan monolaurate.

8. The method according to claim 1, wherein the at least one enzyme is chosen in a pure form.

9. The method according to claim 1, wherein incubating the solid support with the at least one enzyme in the aqueous medium is performed at room temperature and under agitation, at one of 30, 50, 100, 200 and 300 revolutions per minute.

10. The method according to claim 1, wherein measuring the evolution of the concentration of the at least one xenobiotic is performed by one of ultra-violet absorbance measurements and liquid chromatography and tandem mass spectrometry.

11. The method according to claim 1, wherein the at least one xenobiotic is at least one antibiotic.

12. The method according to claim 11, wherein the at least one antibiotic is an antibiotic chosen from one of the class of β-lactam antibiotics and the class of sulfonamide antibiotics.

13. The method according to claim 12, wherein the antibiotic is one of amoxicillin and sulfamethoxazole.

14. A solid support, said support comprising:
at least one enzyme adapted for degrading and inactivating at least one xenobiotic, the at least one xenobiotic being present in an aqueous medium, wherein the at least one enzyme is at least one of a New-Delhi metallo-β-lactamase 1, a laccase extracted from *Pleurotus ostreatus* and a β-lactamase extracted from *Pseudomonas aeruginosa*, and wherein the solid support is a moving bed carrier.

* * * * *